United States Patent
Eaton et al.

(10) Patent No.: US 7,487,188 B2
(45) Date of Patent: Feb. 3, 2009

(54) SYSTEM AND METHOD FOR PROVIDING INCREASED DATABASE FAULT TOLERANCE

(75) Inventors: Kenneth W. Eaton, Terrell, TX (US); Kevin P. Shuma, Celina, TX (US); Joseph B. Lynn, Plano, TX (US)

(73) Assignee: Computer Associates Think, Inc., Islandia, NY (US)

( * ) Notice: Subject to any disclaimer, the term of this patent is extended or adjusted under 35 U.S.C. 154(b) by 442 days.

(21) Appl. No.: 11/189,376

(22) Filed: Jul. 25, 2005

(65) Prior Publication Data

US 2006/0053183 A1    Mar. 9, 2006

Related U.S. Application Data

(60) Provisional application No. 60/608,185, filed on Sep. 7, 2004.

(51) Int. Cl.
G06F 17/30    (2006.01)
(52) U.S. Cl. .......................................... 707/202; 714/6
(58) Field of Classification Search ................. 707/202, 707/204; 714/6
See application file for complete search history.

(56) References Cited

U.S. PATENT DOCUMENTS

| | | | |
|---|---|---|---|
| 4,710,870 A | 12/1987 | Blackwell et al. | |
| 4,714,995 A | 12/1987 | Materna et al. | |
| 5,043,871 A | 8/1991 | Nishigaki et al. | |
| 5,375,234 A | 12/1994 | Davidson et al. | |
| 5,404,508 A | 4/1995 | Konrad et al. | |
| 5,544,325 A * | 8/1996 | Denny et al. ................. | 709/236 |
| 5,592,660 A | 1/1997 | Yokota et al. | |
| 5,606,693 A | 2/1997 | Nilsen et al. | |
| 5,615,364 A | 3/1997 | Marks | |
| 5,668,986 A | 9/1997 | Nilsen et al. | |
| 5,710,922 A | 1/1998 | Alley et al. | |
| 5,740,433 A * | 4/1998 | Carr et al. ................. | 707/202 |
| 5,745,753 A * | 4/1998 | Mosher, Jr. ................. | 707/202 |
| 5,781,910 A * | 7/1998 | Gostanian et al. ........... | 707/201 |

(Continued)

FOREIGN PATENT DOCUMENTS

EP    0 593 062 A2    4/1994

(Continued)

OTHER PUBLICATIONS

Josten J. W., " DB's Use of the Coupling Facility for Data Sharing, " *IBM Systems Journal*, S/390 Parallel Sysplex Cluster, vol. 36, No. 2, 1997, 20 pages <http://www.research.ibm.com/journal/sj/362/josten.html>, visited Jul. 25, 2005.

(Continued)

*Primary Examiner*—Leslie Wong
(74) *Attorney, Agent, or Firm*—Pillsbury Winthrop Shaw Pittman LLP

(57) ABSTRACT

In one embodiment, a Database Management System (DBMS) providing increased fault tolerance includes a first DBMS instance communicably coupled with a data store. The DBMS further includes a second DBMS instance communicably coupled with the data store, with the second DBMS instance including a shadow instance operable to monitor data processing of the first DBMS instance using a communication facility.

32 Claims, 6 Drawing Sheets

U.S. PATENT DOCUMENTS

| | | | |
|---|---|---|---|
| 5,794,252 A * | 8/1998 | Bailey et al. | 707/202 |
| 5,799,323 A * | 8/1998 | Mosher et al. | 707/202 |
| 5,835,915 A * | 11/1998 | Carr et al. | 707/202 |
| 5,842,222 A | 11/1998 | Lin et al. | 707/202 |
| 5,924,094 A * | 7/1999 | Sutter | 707/10 |
| 5,926,816 A | 7/1999 | Bauer et al. | |
| 6,081,806 A | 6/2000 | Chang et al. | |
| 6,430,577 B1 * | 8/2002 | Hart | 707/201 |
| 6,539,381 B1 | 3/2003 | Prasad et al. | |
| 6,820,088 B1 | 11/2004 | Hind et al. | |
| 6,868,428 B2 | 3/2005 | Todokoro et al. | |
| 7,231,391 B2 * | 6/2007 | Aronoff et al. | 707/8 |
| 2002/0143764 A1 | 10/2002 | Martin et al. | |
| 2003/0037149 A1 | 2/2003 | Hess | |
| 2003/0120669 A1 * | 6/2003 | Han et al. | 707/100 |
| 2003/0130985 A1 | 7/2003 | Driesen et al. | |
| 2003/0135478 A1 | 7/2003 | Marshall et al. | |
| 2004/0098417 A1 | 5/2004 | Nishikawa et al. | |
| 2005/0047577 A1 | 3/2005 | Timmins | |
| 2005/0086269 A1 | 4/2005 | Chen et al. | |

FOREIGN PATENT DOCUMENTS

WO  WO 02/098048  12/2002

OTHER PUBLICATIONS

Raften, David, "*Coupling Facility Configuration Options*," IBM, GF22-5042, Jul. 2004, 71 pages <http://www-1.ibm.com/servers/eserver/zseries/library/techpapers/pdf/gf225042.pdf>, visited Jul. 25, 2005.

* cited by examiner

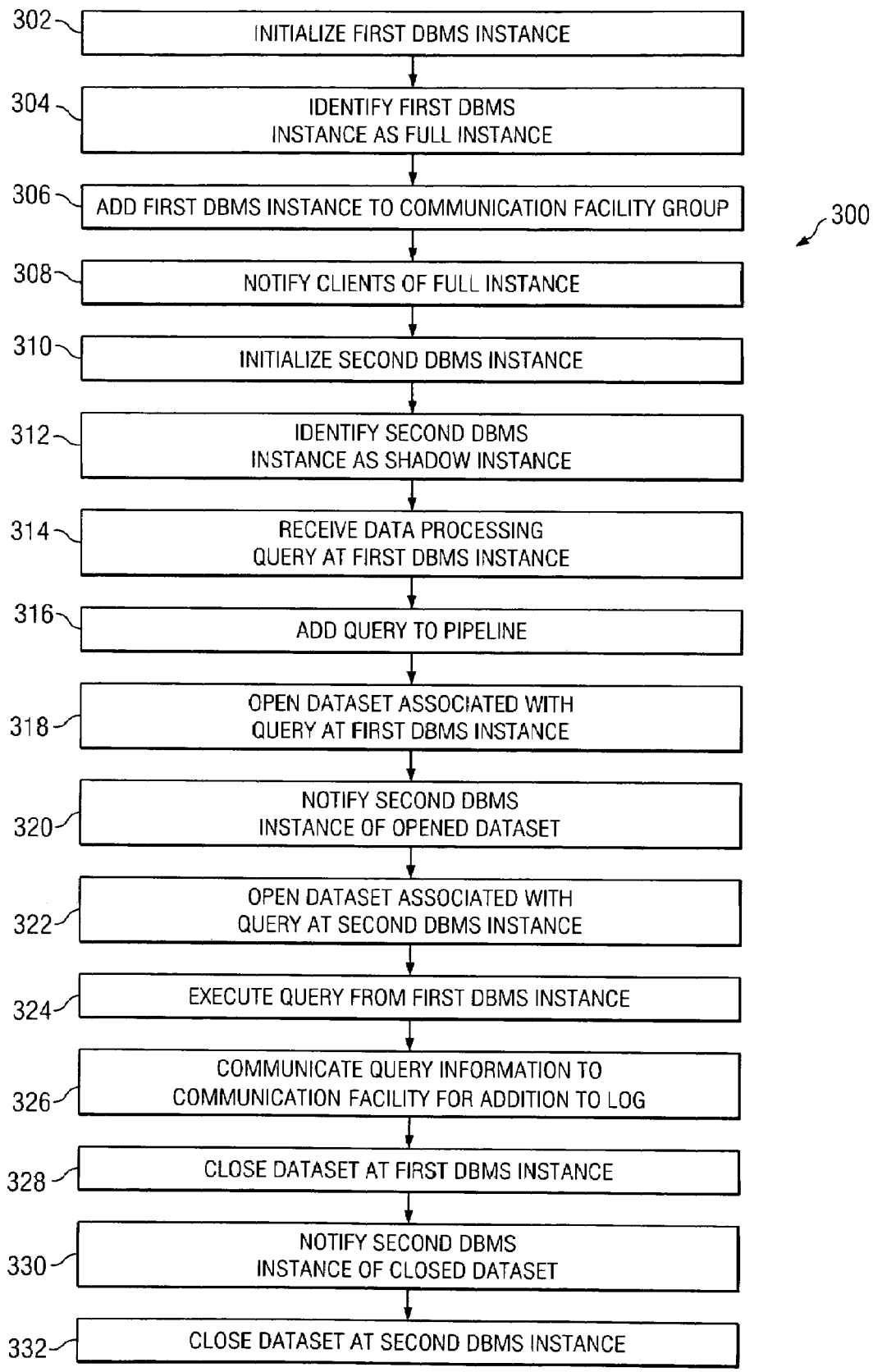

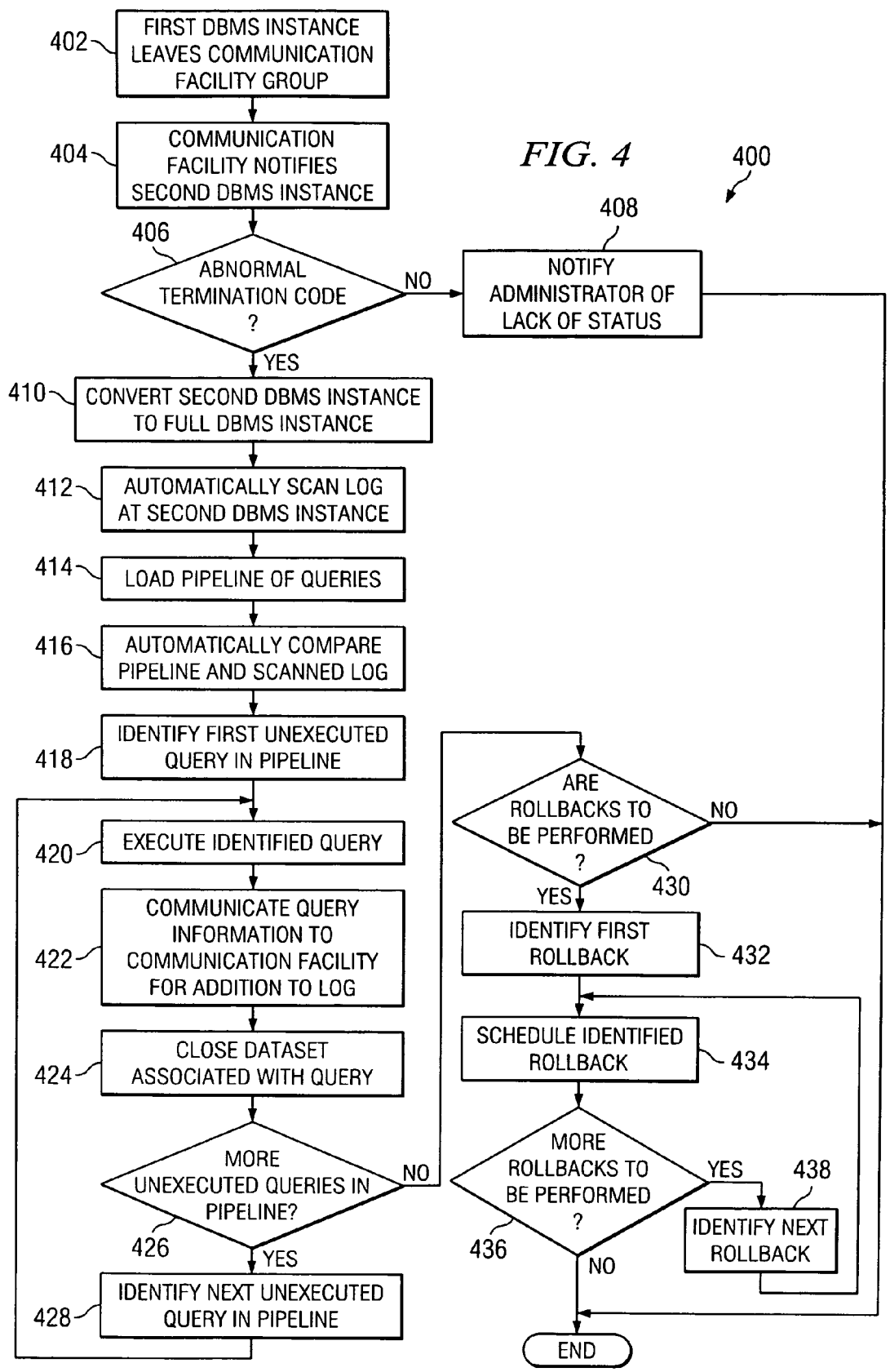

SYSTEM AND METHOD FOR PROVIDING INCREASED DATABASE FAULT TOLERANCE

RELATED APPLICATION

This application claims the priority under 35 U.S.C. § 119 of provisional application Ser. No. 60/608,185 filed Sep. 7, 2004.

TECHNICAL FIELD

This disclosure generally relates to data processing and, more specifically, to a system and method for providing increased database fault tolerance.

BACKGROUND

Enterprises and other organizations store large quantities of business and other data using Database Management Systems (DBMSs). DBMSs are typically programs allowing one or more users to access this data, which may be stored in one of variety of formats. For example, the DBMS may include a relational database, an object-oriented database, and many others. The user submits commands or queries, such as through a client application associated with the DBMS, that are executed by the DBMS on the one or more datasets, which include data requested by the query. These commands may be an instruction to update, delete, select, or other commands operable to process data in the database. In certain circumstances, the DBMS may return results to the user, such as through the client application. But, occasionally, the DBMS may fail in executing the command for any number of reasons including, for example: i) failure of one of the DBMS processes; ii) loss of connectivity to the datasets; and iii) physical interruption to the computing environment.

SUMMARY

This disclosure provides a system and method for providing increased database fault tolerance. In one embodiment, a Database Management System (DBMS) providing increased fault tolerance includes a first DBMS instance communicably coupled with a data store. The DBMS further includes a second DBMS instance communicably coupled with the data store, with the second DBMS instance comprising a shadow instance operable to monitor data processing of the first DBMS instance using an available communication facility. This facility would allow the two instances of the DBMS (the Primary and the Shadow) to communicate key elements about the processing being done by the Primary instance to the Shadow instance. If for any reason the Primary instance were to fail the Shadow instance would become an active processor and take over the work being done by the Primary instance. Thus providing a significant fault-tolerance capability for relatively low-cost of the Primary to Shadow communications. The details of one or more embodiments of the disclosure are set forth in the accompanying drawings and the description below. Particular features, objects, and advantages of the disclosure will be apparent from the description and drawings and from the claims.

DESCRIPTION OF DRAWINGS

FIG. 3 is a flowchart illustrating an example method for providing fault tolerance in accordance with one embodiment of the present disclosure; and FIG. 4 is a flowchart illustrating an example method for recovering from a failure of the full database management system instance in accordance with one embodiment of the present disclosure.

DETAILED DESCRIPTION

Figure 1:
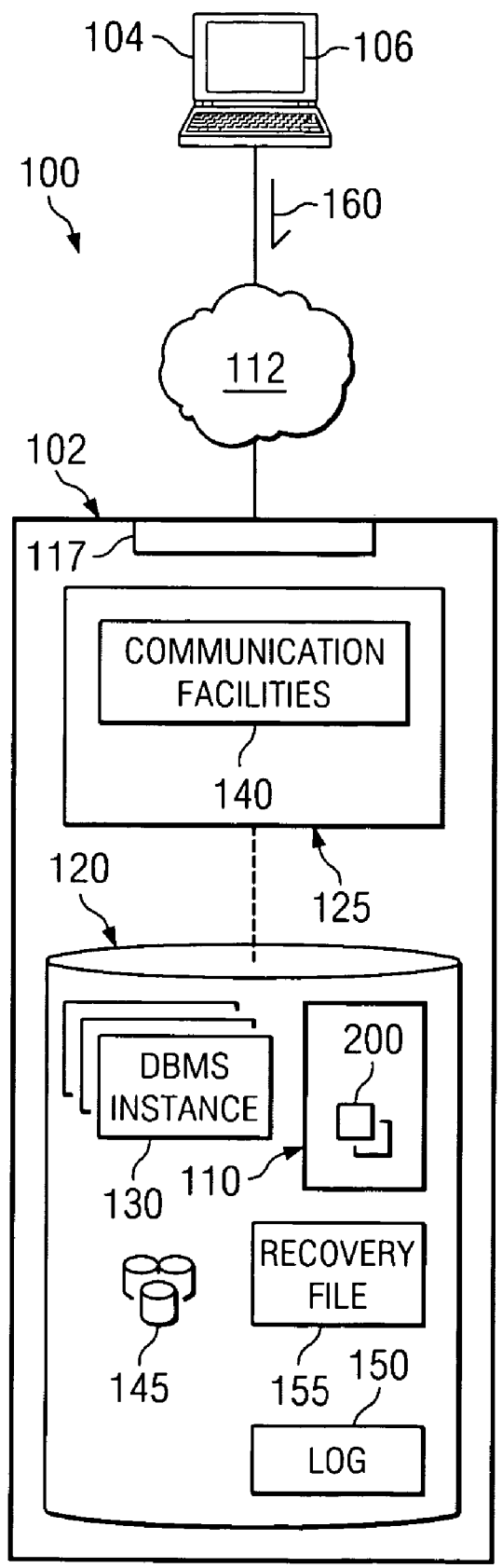
FIG. 1 illustrates a data processing environment including a database management system with increased fault tolerance in accordance with one embodiment of the present disclosure.

FIG. 1 illustrates a data processing environment 100 that includes increased fault tolerance in accordance with one embodiment of the present disclosure. Generally, data processing environment 100 includes a primary, or full, Database Management System (DBMS) instance 130*a* for processing queries 160. Data processing environment 100 further includes a shadow DBMS instance 130*b* that monitors the processing by the full DBMS instance 130*a*, thereby environment 100 may more quickly recover from a failure of the full instance 130. In certain embodiments, shadow DBMS instance 130*b* performs only a portion of the full processing in parallel to allow for a more efficient assumption of the data processing responsibilities without the overhead of a full mirroring of the executed commands. Moreover, data processing environment 100 may include a third DBMS instance 130*c* that acts as a second shadow, but which typically resides in a separate region or logical partition 200 from the full instance 130. In this circumstance, if first and second DBMS instances 130 fail due to an operating system, hardware, or other region-wide failure, third DBMS instance 130 may quickly assume data processing with reduced downtime between data processing capabilities or without significant loss of data. Data processing environment 100 may communicably couple full DBMS instance 130 with the one or more shadow instances 130 through various communication facilities 140 that exist within the hardware and/or operating system (such as, for example, the IBM z/OS XCF facility and the IBM Parallel Sysplex Coupler facility), which logs the processing of full DBMS instance 130 and facilitates communications between DBMS instances 130.

Data processing environment 100 is typically a distributed client/server system that allows users of clients 104 to submit queries 160 to full DBMS instance 130 for processing of data stored in a local or remote data repository, illustrated as data repository 145. For example, environment 100 may include a server 102 that is connected, through network 112, to one or more local or remote clients 104. But environment 100 may be a standalone computing environment, such as an administrator logged on to server 102, or any other suitable environment without departing from the scope of this disclosure, so long as shadow DBMS instance 130 dynamically monitors the processing of full DBMS instance 130 and, at least partially, automatically assumes data processing from full DBMS instance 130 in the event of abnormal termination or other failure. The term "dynamically," as used herein, generally means that certain processing is determined, at least in part, at run-time based on one or more variables. The term "automatically," as used herein, generally means that the appropriate processing is substantially performed by at least part of data processing environment 100. It should be understood that "automatically" further contemplates any suitable user or administrator interaction with server 102 without departing from the scope of this disclosure.

Server 102 includes memory 120 and processor 125 and comprises an electronic computing device operable to receive, transmit, process and store data associated with environment 100. For example, server 102 may be any computer or processing device such as a mainframe, a blade server, general-purpose personal computer (PC), Macintosh, workstation, Unix-based computer, or any other suitable device. Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, environment 100 can be implemented using computers other than servers, as well as a server pool. Server 102 may be adapted to execute any operating system 110 including z/OS, Linux-Intel or Linux/390, UNIX, Windows Server, or any other suitable operating system. According to one embodiment, server 102 may also include or be communicably coupled with a web server and/or a mail server.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes operating system 110, two or more DBMS instances 130, data repository 145, log 150, recovery file 155, but may also include any other appropriate data such as administration or user policies, security services, and such.

In certain embodiments, operating system 110 may be logically divided into two or more logically partitions 200. In other embodiments, server 102 may be logically partitioned into multiple partitions 200, each with its own operating system 110. Two or more logical partitions 200 allow one server 102 to operate as if it were two or more independent servers. In other words, each logical partition 200 comprises a set of hardware and/or software resources (such as operating system 110, user access, security, applications, time zones, disk drive access, and others) that operates as an independent system. Accordingly, logical partitions 200 may share processing resources, such as processor 125 time or data repository 145, based on application requirements, time of day, week or month, or processing workloads. It will be understood that operating system 100 may not be logically partitioned or may be partitioned into any number of regions, as appropriate. If partitioned, in certain embodiments, various DBMS instances 130 may reside in different logical partitions 200, whether local or remote, to help ensure data processing consistency and reliability in the event of a region failure.

DBMS instances 130 are generally high performance, multi-user database environments or facilities that are each communicably coupled to data repository 145. In certain embodiments, each DBMS instance 130 is operable to process queries 160 through data repository 145, but one DBMS instance 130 may be designated or identified as the primary instance and the remaining instances 130 acting as failover instances. For example, each DBMS instance 130 may be one or more processes, objects, or applications written or described in any appropriate computer language including C, C++, C#, Java, Visual Basic, assembler, any suitable version of 4GL, and others or any combination thereof. It will be understood that while DBMS instance 130 is described in terms of a single multi-tasked module, the features and functionality performed by each instance may be performed by multiple modules. Further, while illustrated as internal to server 102, one or more processes associated with each DBMS instance 130 may be stored, referenced, or executed remotely. Moreover, each DBMS instance 130 may be a child or sub-module of another software module (such as a DBMS manager, which is not illustrated) without departing from the scope of this disclosure. At a high level, at least one of the DBMS instances 130 is a full DBMS instance, which typically processes queries 160 and appropriately manages data repository 145 as if it is the sole executing DBMS. Further, at least one of the executing DBMS instances 130 comprises a shadow DBMS instance. As used herein, a shadow DBMS instance 130 is operable to monitor at least some of the processing by the associated full DBMS instance and perform (perhaps substantially) reduced parallel processing of data repository 145, resulting in lower overhead. For example, shadow DBMS instance 130 may merely execute open/close dataset commands and not select, update, and other processing-intensive or involved commands.

Data repository 145 include any parameters, variables, schemas, algorithms, or other data store operable to be accessed by a plurality of DBMS instances 130. In certain embodiments, each DBMS instance 130 may be communicably coupled with data repository through communication facility 140. For example, data repository 145 may allow multiple DBMS instances 130 to open a particular dataset logically represented or stored in the data store. In one embodiment, data repository 145 may comprise one or more tables, or datasets, stored in a relational database described in terms of SQL statements or scripts. In another or complimentary embodiment, data repository 145 may store or define various data structures as text files, extensible Markup Language (XML) documents, Virtual Storage Access Method (VSAM) files, flat files, Btrieve files, comma-separated-value (CSV) files, internal variables, and/or one or more libraries. In short, data repository 145 may comprise one table or file or a plurality of tables or files stored on one computer or across a plurality of computers in any appropriate format. Moreover, data repository 145 may be local and/or remote without departing from the scope of this disclosure and store any type of appropriate data.

Memory 120 may further include or reference log 150 and recovery file 155. Generally, recovery file 155 and log 150 are used by at least one of the DBMS instances 130 to aid in recovery from a system failure or a program malfunction. In one embodiment, log 150 comprises temporary storage or cache of maintenance transactions logged by full DBMS instance 130 and recovery file 155 comprises a more permanent store for the log records. Each may be in any suitable format, such as a text file or database table, or location without departing from the scope of the disclosure. Moreover, it will be understood that while illustrated separately, log 150 and recovery file 155 may be the same table or file and reference to one may include the other as appropriate.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes at first, or full, DBMS instance 130, which performs at least a portion of the data processing and is communicably connected to the one or more shadow DBMS instances 130 through communication facility 140.

Communication facility 140 could include any hardware, software, firmware, or combination thereof operable to allow multiple instances 130 to communicate with data repository 145 and may act as a communication vehicle and shared memory. Generally, communication facility 140 is further operable to allow the one or more shadow instances 130 to monitor data processing by the full instance 130, such as through logging. Communication facility 140 may be written or described in any appropriate computer language including C, C++, C#, Java, Visual Basic, assembler, any suitable version of 4GL, and others or any combination thereof. It will be understood that while communication facility 140 is illustrated in FIG. 1 as a single multi-tasked module, the features and functionality performed by this engine may be performed by multiple module. Further, while illustrated as internal to server 102, one or more processes associated with communication facility 140 may be stored, referenced, or executed remotely. Moreover, communication facility 140 may be a child or sub-module of another software module (such as a parallel processing application, not illustrated) without departing from the scope of this disclosure.

Server 102 may also include interface 117 for communicating with other computer systems, such as client 104, over network 112 in a client-server or other distributed environment. In certain embodiments, server 102 receives queries 160 from internal or external senders through interface 117 for storage in memory 120 and/or processing by the one or more processors 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Indeed, while illustrated as a single networks, network 112 may be a continuous, logically distributed, or physically distributed network without departing from the scope of this disclosure, so long as at least portion of network 112 may facilitate communications between senders and recipients of queries 160. In other words, network 112 encompasses any internal or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Client 104 is any local or remote computing device operable to present the user with a view of data associated with environment 100 and receive data processing queries 160 via, for example, a GUI 106. At a high level, each client 104 includes GUI 106 and comprises an electronic computing device operable to receive, transmit, process and store any appropriate data associated with environment 100. While only one client 104 is illustrated, it will be understood that there may be any number of clients 104 communicably coupled to server 102. For example, there may be a plurality of clients 104 including local clients 104 (such as an administration workstation) and remote clients 104 to the illustrated portion of environment 100. Further, "client 104," "administrator," and "user" may be used interchangeably as appropriate without departing from the scope of this disclosure. As used in this disclosure, client 104 is intended to encompass a personal computer, touch screen terminal, workstation, network computer, kiosk, wireless data port, wireless or wireline phone, personal data assistant (PDA), one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or GUI 106. Both the input device and output device may include fixed or removable storage media such as a magnetic computer disk, CD-ROM, or other suitable media to both receive input from and provide output to users of clients 104 through the display, namely GUI 106.

GUI 106 comprises a graphical user interface operable to allow the user of client 104 to interface with at least a portion of environment 100 for any suitable purpose. Generally, GUI 106 provides the user of client 104 with an efficient and user-friendly presentation of data provided by or communicated within environment 100. GUI 106 may comprise a plurality of customizable frames or views having interactive fields, pull-down lists, and buttons operated by the user. It should be understood that the term graphical user interface may be used in the singular or in the plural to describe one or more graphical user interfaces and each of the displays of a particular graphical user interface. Therefore, GUI 106 contemplates any graphical user interface, such as a generic web browser or touch screen, that processes information in environment 100 and efficiently presents the results to the user. Server 102 can accept data from client 104 via the web browser (e.g., Microsoft Internet Explorer or Netscape Navigator) and return the appropriate HTML or XML responses using network 112.

In one aspect of operation of certain embodiments, at least one full DBMS instance 130 and at least one shadow DBMS instance 130 are initialized or are currently executing. Communications facility 140 is aware of the existence and location of the two or more DBMS instances 130 and is communicably coupled with each. Indeed, full DBMS instance 130 may be part of a communication facility group, which allows communication facilty 140 to maintain some management control or observation of full DBMS instance 130. A user or program at client 104 submits a query 160, or other data processing command, for accessing or updating data in data repository 145. Full DBMS instance 130 receives or retrieves query 160 and opens the one or more datasets associated with query 160. For example, query 160 may request certain rows from a table stored in data repository 145. In this example, full DBMS instance 130 opens the table for subsequent processing. Once full DBMS instance 130 opens the dataset, it notifies shadow DBMS instance (perhaps through communication facility 140) of the opened dataset. In certain embodiments, shadow DBMS instance 130 then performs a parallel or mirror open of the dataset based on this notification, thereby allowing for a more efficient recovery from a failure or other outage of full DBMS instance 130. Once full DBMS instance 130 opens the dataset, it then executes one or more commands associated with query 160. Of course, in certain embodiments, query 160 may include the actual commands thus allowing full DBMS instance 130 to execute query 160 without further conversion or interpretation. During or after execution of the commands, full DBMS instance 130 communicates information associated with query 160 to log 150.

Upon a failure or outage of full DBMS instance 130 or lack on connectivity between full DBMS instance 130 and communication facilty 140 or other component, shadow DBMS instance 130 at least attempts to recover from the failure by assuming full data processing responsibly in place of missing full DBMS instance 130. In certain embodiments however, shadow DBMS instance 130 may not assume full DBMS status in the event that it is unable to determine if full DBMS instance 130 abnormally terminated, thereby helping to reduce data corruption or other inconsistencies. If shadow DBMS instance 130 determines that it should assume full DBMS status, then it restarts or converts itself to a full DBMS instance 130. Next, the now-full DBMS instance 130 scans log 150 and determines the status of received queries 160. If the new full DBMS instance 130 determines that certain received queries 160 were unexecuted by the failed original full DBMS instance 130, then the new full DBMS instance 130 executes them. In certain embodiments, the datasets associated with these unexecuted queries 160 were already opened by the once-shadow DBMS instance 130, thereby saving time and processing power. New full DBMS instance 130 may also schedule any necessary rollbacks as appropriate. Once the recovery is substantially complete, normal data processing may resume using the new full DBMS instance 130 as the primary DBMS application.

Figure 2A:
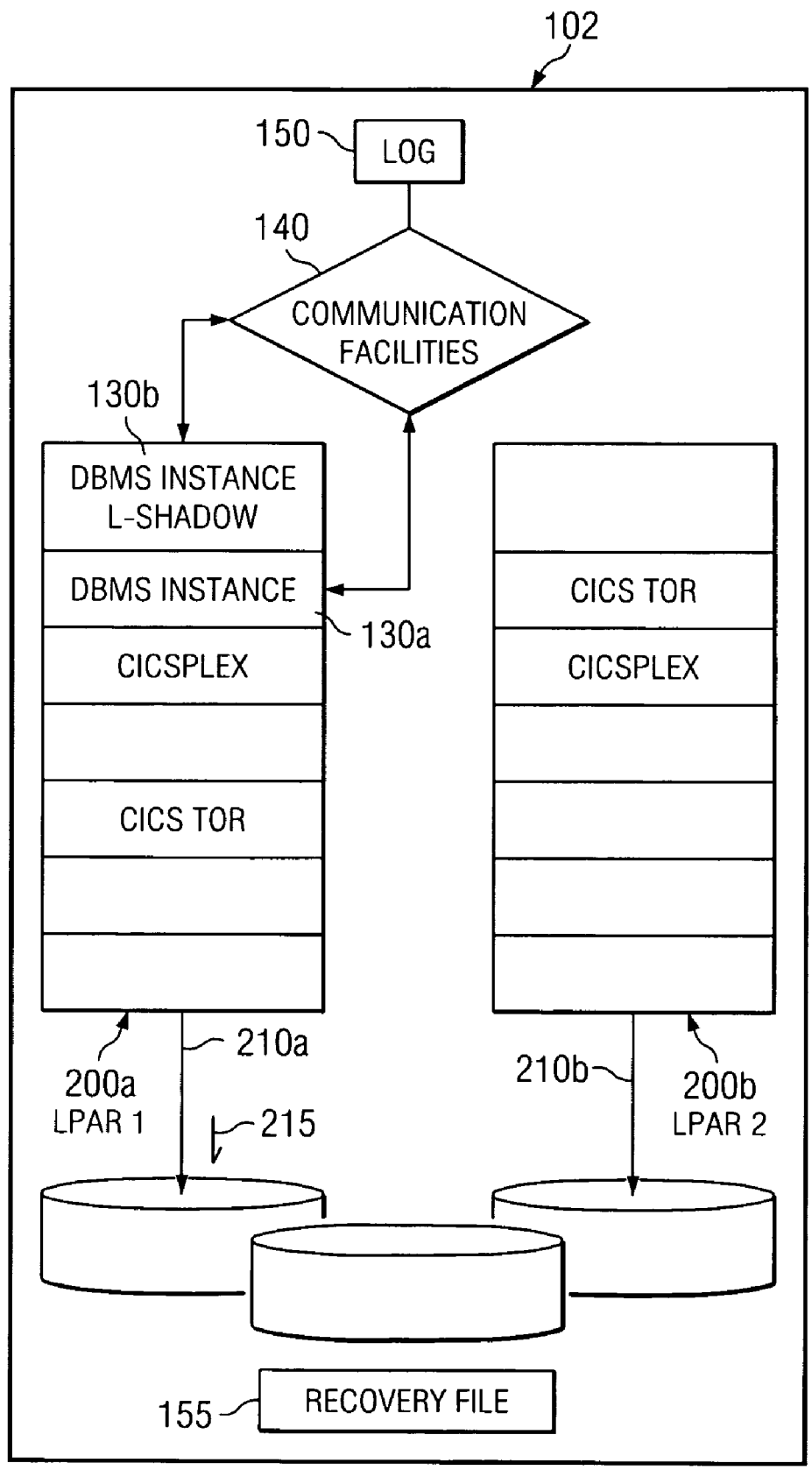
FIGS. 2A-C illustrate various configurations of the database management system instances in the environment of FIG. 1.
Figure 2B:
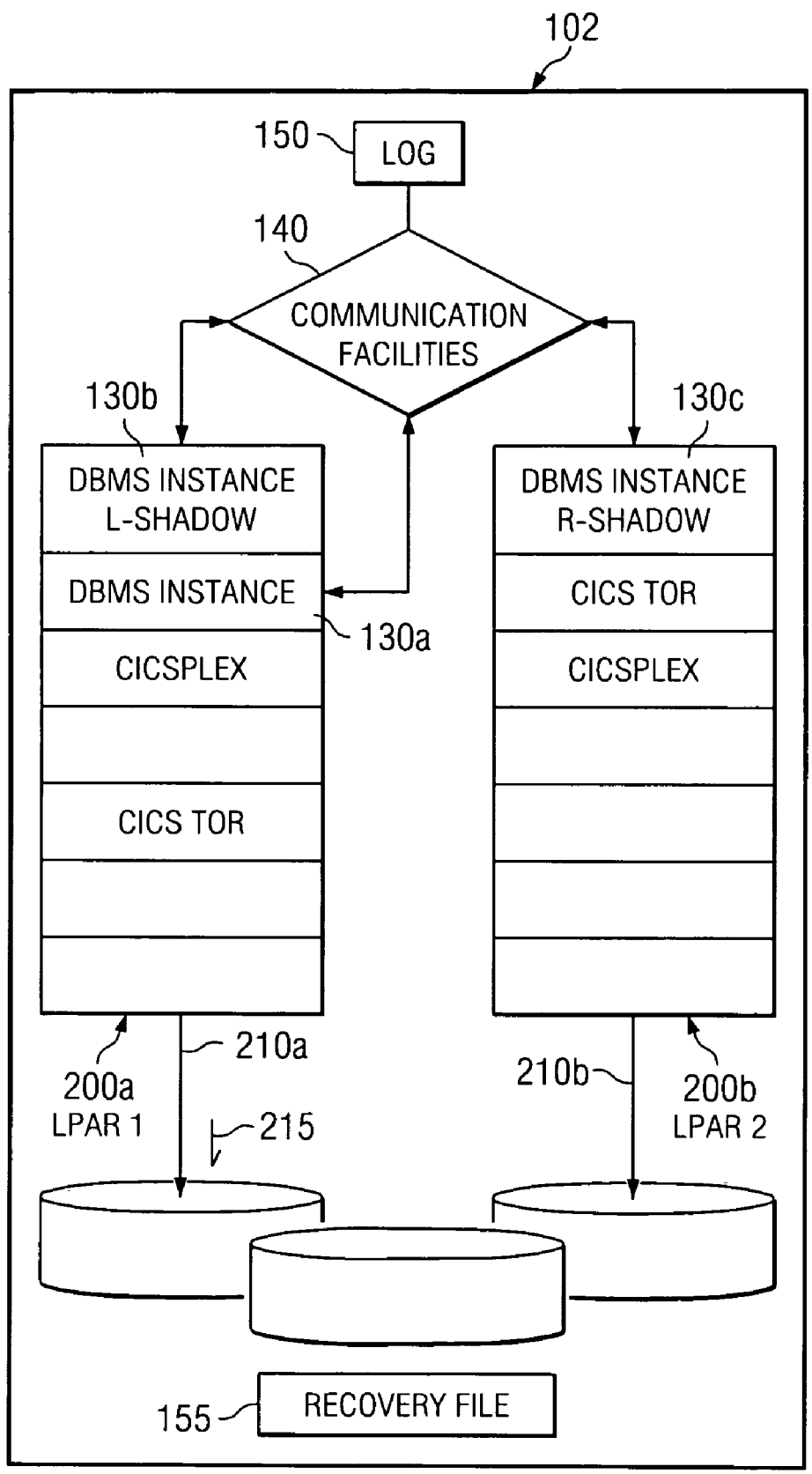
Figure 2C:
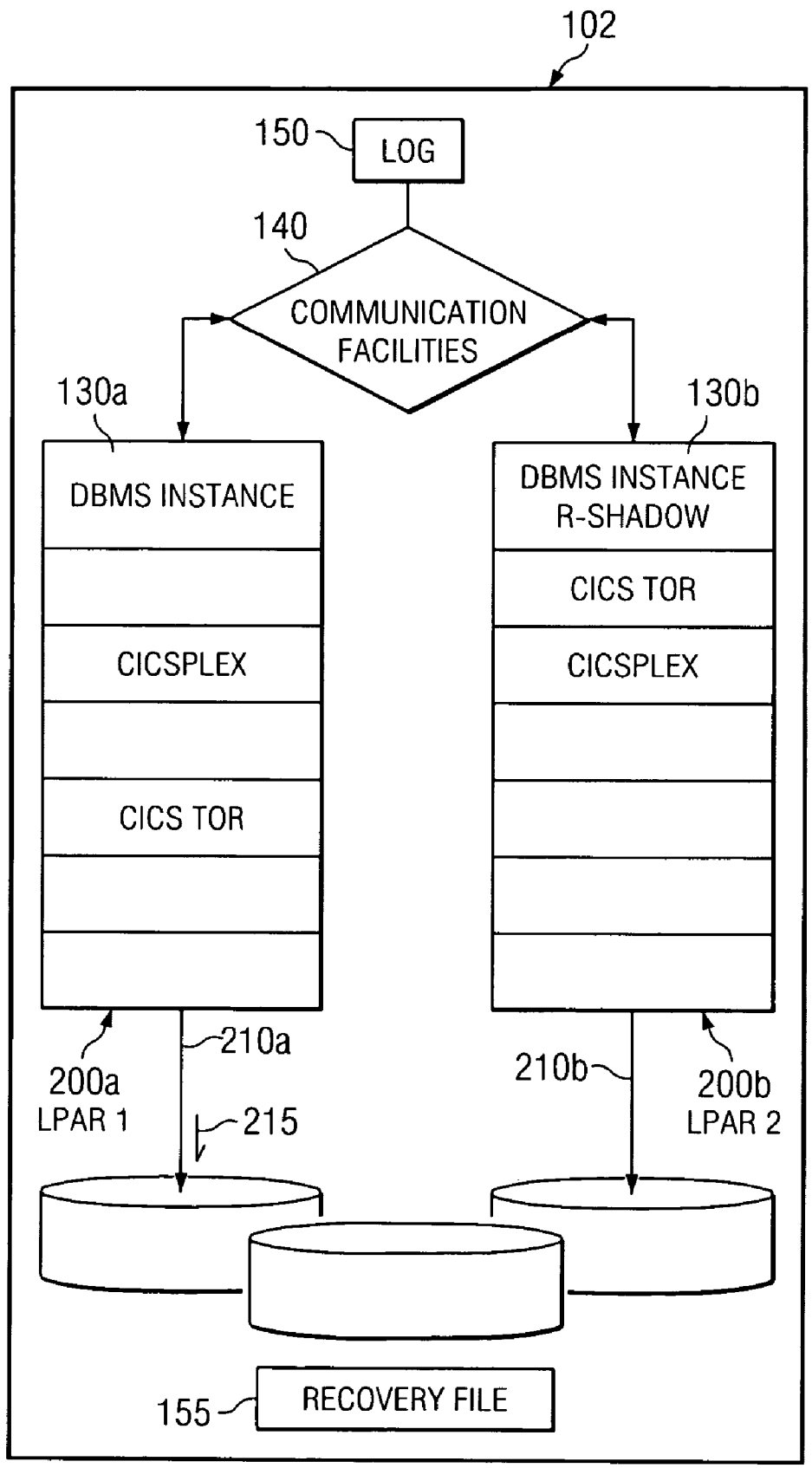

FIGS. 2A-C illustrate various configurations of the database management system instances in environment 100. More specifically, FIGS. 2A-C describe various locations of shadow DBMS instances 130 in a logically partitioned server 102. While described in various configurations, each shadow Database Management System instance 130 may be local or remote to full DBMS instance 130, so long as the one or more shadow instances 130 remain communicably coupled with communication facility 140, data repository 145, full DBMS instance 130, and/or other appropriate sub-modules and components. Generally, FIG. 2A illustrates a first configuration including a first DBMS instance 130a (acting as full DBMS) and a second DBMS instance 130b (acting as a local shadow DBMS), each residing in the same logical partition 200a. As illustrated, first DBMS instance 130a is communicably coupled to data repository 145 via link 210, which facilitates communication of data pipeline 215. FIG. 2B is similar to FIG. 2A, but further includes a third DBMS instance 130c that resides in second partition 200b and acts or executes as a remote shadow. In this embodiment, third DBMS instance 130c may assume full data processing responsibilities in the event that first logical partition 200a fails or terminates, resulting in the outage of full DBMS instance 130a and local shadow DBMS instance 130b. But it will be understood that third DBMS instance 130c may convert to full status at any appropriate time, including prior to second DBMS instance 130b, without departing from the scope of this disclosure. Returning to the illustrated embodiment, third DBMS instance 130b is communicably coupled to data repository 145 through link 210b. FIG. 2C illustrates a configuration that includes two DBMS instances: a first DBMS instance 130a, performing full DBMS capabilities from first logical partition 200a, and a remote second DBMS instance 130b, performing shadowed DBMS capabilities from second logical partition 200b. In FIGS. 2A-C all query processing is done by the primary DBMS instance 130 until such time as a failure occurs that causes the shadow DBMS instance 130 to take over processing responsibilities.

FIG. 3 is a flowchart illustrating an example method 300 for providing fault tolerance in accordance with one embodiment of the present disclosure. At a high level, method 300 includes executing a first DBMS instance 130a, configured as a full instance, and a second DBMS instance 130b, configured as a shadow instance. As described above, shadow DBMS instance 130b monitors full DBMS instance 130a in order to at least partially assume data processing in response to failure of full DBMS instance 130a. The following description focuses on the operation of a plurality of database instances 130 and communication facility 140 in performing method 300. But environment 100 contemplates using any appropriate combination and arrangement of logical elements implementing some or all of the described functionality.

Example method 300 begins at step 302, where first DBMS instance 130 is loaded, initialized, restarted, or otherwise executed. Next, at step 304, first DBMS instance 130 is identified as a full instance. For example, first DBMS instance 130 may include a startup option identifying the instance as a full DBMS instance. As described above, being identified as a full DBMS instance implies that queries 160 are substantially, if not fully, processed through first DBMS instance 130. Put another way, first DBMS instance 130 typically manages data processing and data repository 145 until it fails or is brought down by a database administrator. Next, first DBMS instance 130 is added to a group associated with communication facility 140 at step 306. In one embodiment, clients 104 are notified of the particular full instance 130 at step 308. In another embodiment, clients 104 may be at least partially unaware of the particular full instance 130 and may instead communicate queries 160 through database interfaces or protocols, such as open database connectivity (ODBC), Java Database Connectivity (JDBC), Object Linking and Embedding Database (OLE DB), ActiveX Data Object (ADO), Common Gateway Interface (CGI), and others, which may instead be aware of the particular full DBMS instance 130a. Next, a second DBMS instance 130b is loaded, initialized, or otherwise executed at step 310. Second DBMS instance 130b is identified as a shadow instance at step 312. As described above, shadow instance 130b typically tracks the progress of first DBMS instance 130a through monitoring and performs reduced parallel processing to possibly allow for quicker assumption of full database processing.

Once first and second DBMS instances 130 are being executed, regular processing may be performed with increased fault tolerance. For example, at step 314, first DBMS instance 130a receives a data processing query 160. One example query 160 may be a select, change or modify, delete, add, drop table, or any other data processing command. Query 160 is then added to a query pipeline 215 at step 316. Next, first DBMS instance 130a then opens the dataset in data repository 145 based on received query 160 at step 318. It will be understood that while described in terms of one dataset, query 160 may reference or be associated with any number of datasets without departing from the scope of this disclosure. For example, first DBMS instance 130a may open two or more datasets in response to an inner or outer join command. Next, first DBMS instance 130a notifies second DBMS instance 130 of the particular opened dataset at step 320. This notification may be communicated directly from first DBMS instance 130a to second DBMS instance 130b, through communication facility 140, or using any other communication technique or component. At least partially based on this notification, second DBMS instance 130b opens the same dataset associated with query 160 at step 322. At step 324, first DBMS instance 130a then executes the received query 160. Information associated with the executed query 160 is communicated to log 150 at step 326. Next, first DBMS instance 130a closes the opened dataset at step 328. Second DBMS instance 130b is then (or concurrently) notified of the closed (or closing) dataset at step 330. Once notified, second DBMS instance 130b closes the particular dataset at step 332.

FIG. 4 is a flowchart illustrating an example method 400 for recovering from a failure of the full Database Management System instance in accordance with one embodiment of the present disclosure. At a high level, method 400 includes communication facility 140 notifying second DBMS instance 130b (described herein, for example, as the shadow instance) of a failure of full DBMS instance 130a and second DBMS instance 130b automatically performing various data recovery steps. As with FIG. 3, the following description focuses on the operation of database instances 130 and communication facility 140 in performing method 400. But environment 100 contemplates using any appropriate combination and arrangement of logical elements implementing some or all of the described functionality.

Method 400 begins at step 402, when first DBMS instance 130a leaves one of the communication facility groups or communication facility 140. As described above, first DBMS instance 130a may leave the communication facility group due to an abnormal termination, loss of connectivity with communication facility 140, or for any other appropriate reason. At step 404, communication facility 140 notifies the second DBMS instance 130b of the failure a first DBMS instance 130. At decisional step 406, second DBMS instance 130b determines if there is an abnormal termination code or other similar status with the leaving of the full DBMS instance 130a. In other words, second DBMS instance 130b may be determining if first DBMS instance 130b is executing, but has merely lost communication with communication facility 140. If second DBMS instance 130b is unable to determine that first DBMS instance 130a abnormally terminated, then in one embodiment second DBMS instance 130b notifies an administrator or other user or component of the lack of status at step 408. Once the example administrator has been notified, processing may end. It will be understood that the ending of the recovery processing may be to ensure that data corruption or other complications don't occur due to executing two full instances 130. It will further be understood however that, in another embodiments, second DBMS instance 130b may determine to move forward with conversion from a shadow to full instance 130 to assist in recovery. In the illustrated embodiment, if second DBMS instance 130b is able to determine that first DBMS instance 130a abnormally terminated, then second DBMS instance 130b is converted from a shadow to full DBMS instance 130 at step 410.

Once second DBMS instance 130b has restarted, upgraded, or otherwise converted to a full DBMS instance 130, it automatically scans log 150 at step 412. Next, at step 414, second DBMS instance 130b loads a pipeline 215 of queries 216 that were received by first DBMS instance 130a and compares pipeline 215 to scanned log 150 at step 416. Based upon this comparison, second DBMS instance 130b identifies the first unexecuted query in pipeline 215 at step 418 and executes it at step 420. At step 422, second DBMS instance 130b communicates query information to log 150. Next, second DBMS instance 130b closes the dataset (may be one or more) associated with query 160 at step 424. It will be understood that the dataset is often opened by second DBMS instance 130 while performing as a shadow instance. This action normally requires very little overhead and often speeds recovery time of the converted second DBMS instance 130b. Next, second DBMS instance 130b determines if there are more unexecuted queries 160 in pipeline 215 at decisional step 426. If there are, then second DBMS instance 130b identifies the next unexecuted query 160 in pipeline 215 at step 428 and processing returns to step 420. Once the unexecuted queries 160 have been appropriately processed, second DBMS instance 130b determines if there any rollbacks that should be performed at decisional step 430. This determination may be based on any suitable algorithms, administrative settings, or standard DBMS processing. If no rollbacks are to be performed, then recovery processing may end. If rollbacks are to be performed, then second DBMS instance 130b identifies the first rollback at step 432 and schedules the identified rollback at step 434. If more rollbacks are to be performed at decisional step 436, then second DBMS instance 130b identifies the next rollback at step 438 and processing returns to step 434. Once all the rollbacks have been suitably scheduled or otherwise executed, then example recovery processing ends.

The preceding flowcharts and accompanying description illustrate exemplary methods 300 and 400. In short, environment 100 contemplates using any suitable technique for performing these and other tasks. Accordingly, many of the steps in these flowcharts may take place simultaneously and/or in different orders than as shown. Moreover, environment 100 may use methods with additional steps, fewer steps, and/or different steps, so long as the methods remain appropriate.

Although this disclosure has been described in terms of certain embodiments and generally associated methods, alterations, and permutations of these embodiments and methods will be apparent to those skilled in the art. For example, a DBMS instance manager may be intelligent enough or otherwise operable to determine which of a plurality of shadow DBMS instances to restart to full status and/or when to do it. Accordingly, the above description of example embodiments does not define or constrain this disclosure. Other changes, substitutions, and alterations are also possible without departing from the spirit and scope of this disclosure.

What is claimed is:

1. A system for providing increased fault tolerance in a data storage environment, comprising:
    a first Database Management System (DBMS) instance that initiates at least one first process associated with execution of a request to interact with a data store, the first DBMS instance being a primary handler of requests to interact with the data store; and
    a second DBMS instance that initiates at least one second process associated with the at least one first process, the second DBMS instance being a shadow instance that monitors the first DBMS instance, wherein the first DBMS instance and the second DBMS instance are communicably coupled with the data store, wherein the first DBMS instance is communicably coupled to the second DBMS instance through a communication facility, and wherein the first DBMS instance uses the communication facility to notify the second DBMS instance of the at least one first process,
    wherein the at least one first process comprises execution of a first command to open a dataset in the data store,
    wherein notification by the first DBMS instance to the second DBMS instance comprises communicating a message to the second DBMS instance, the message notifying the second DBMS instance of the dataset to be opened,
    wherein the at least one second process comprises execution of a second command to open the dataset based, at least in part, on the message,
    wherein the dataset to be opened is opened in parallel by the first DBMS instance and the second DBMS instance, whereby the dataset to be opened is opened by the second DBMS instance before failure of the first DBMS instance.

2. The system of claim 1, wherein the first DBMS instance further:
executes a data processing query using the opened dataset; and
communicates information associated with the data processing query to the second DBMS instance through the communication facility.

3. The system of claim 2, wherein:
the first DBMS instance generates a log comprising information related to data processing of the first DBMS instance; and
the second DBMS instance monitors data processing of the first DBMS instance using the communication facility to scan the log.

4. The system of claim 3, wherein the second DBMS instance automatically performs data processing in response to a failure of the first DBMS instance.

5. The system of claim 4, wherein the second DBMS instance:
reprocesses a pipeline executed by the first DBMS instance on the data store based, at least in part, on the scanned log; and
in response to identifying a rollback, schedules the rollback for the data store.

6. The system claim 2, the first DBMS instance executing a command to close the dataset and communicating a message to the second DBMS instance, the message notifying the second DBMS instance of the dataset to be closed; and
the second DBMS executing a second command to close the dataset based, at least in part, on the message.

7. The system claim 1, wherein:
the second DBMS instance receives notification that the first DBMS instance failed to execute the request; and
the second DBMS instance attempts to execute the request using, at least in part, the at least one second process.

8. The system of claim 1, wherein the second DBMS instance comprises a local DBMS instance.

9. The system of claim 8, further comprising a third DBMS instance communicably coupled to the data store, the third DBMS instance comprising a second shadow instance operable to monitor data processing of the first DBMS instance using the communication facility and the third DBMS instance comprising a remote DBMS instance.

10. The system of claim 1, wherein the second DBMS instance comprises a remote DBMS instance.

11. The system of claim 1, wherein the first DBMS instance executes in a first logical partition and the remote second DBMS instance executes in a second logical partition.

12. A method for providing increased database fault tolerance in a data storage environment, wherein a first Database Management Service (DBMS) instance and a second DBMS instance are communicably coupled with a data store, and wherein the first DBMS instance is communicably coupled to the second DBMS instance through a communication facility, the first DBMS instance being a primary handler of requests to interact with the data store and the second DBMS instance being a shadow instance that monitors the first DBMS instance, the method comprising:
initiating, by the first DBMS instance, at least one first process associated with execution of a request to interact with the data store;
notifying, by the first DBMS instance using the communication facility, the second DBMS instance of the at least one first process;
initiating, by the second DBMS instance, at least one second process associated with the at least one first process; and
executing a command from the first DBMS instance to open a dataset in the data store, wherein notifying, by the first DBMS instance, the second DBMS instance comprises communicating a message from the first DBMS instance to the second DBMS instance, the message notifying the second DBMS instance of the dataset to be opened, and wherein the at least one second process comprises executing a second command from the second DBMS instance to open the dataset based, at least in part, on the message,
wherein the dataset to be opened is opened in parallel by the first DBMS instance and the second DBMS instance, whereby the dataset to be opened is opened by the second DBMS instance before failure of the first DBMS instance.

13. The method of claim 12, further comprising:
executing a data processing query from the first DBMS instance using the opened dataset; and
communicating information from the first DBMS instance associated with the data processing query to the communication facility.

14. The method of claim 13, further comprising:
generating a log by the first DBMS instance, the log comprising information related to data processing of the first DBMS instance; and
monitoring data processing of the first DBMS instance at the second DBMS instance using the communication facility to scan the log.

15. The method of claim 14, further comprising performing data processing using the second DBMS instance in response to a failure of the first DBMS instance.

16. The method of claim 15, wherein performing data processing using the second DBMS instance in response to a failure of the first DBMS instance comprises:
reprocessing a pipeline executed by the first DBMS instance on the data store using the second DBMS based, at least in part, on the scanned log; and
in response to identifying a rollback, scheduling the rollback for the data store using the second DBMS.

17. The method of claim 13, further comprising:
executing a command to close the dataset using the first DBMS instance;
communicating a message from the first DBMS instance to the second DBMS instance, the message notifying the second DBMS instance of the dataset to be closed; and
executing a second command from the second DBMS to close the dataset based, at least in part, on the message.

18. The method of claim 12, further comprising:
receiving, by the second DBMS instance, notification that the first DBMS instance failed to execute the request; and
attempting, by the second DBMS instance, to execute the request using, at least in part, the at least one second process.

19. The method of claim 12, the second DBMS instance comprising a local DBMS instance.

20. The method of claim 19 further comprising monitoring data processing of the first DBMS instance at a third DBMS instance using the communication facility communicably coupled to the data store, the third DBMS instance comprising a second shadow instance operable to and the third DBMS instance comprising a remote DBMS instance.

21. The method of claim 12, the second DBMS instance comprising a remote DBMS instance.

22. The method of claim 12, wherein executing the first DBMS instance comprises executing the first DBMS instance in a first logical partition and wherein executing the second DBMS comprises executing the remote second DBMS instance in a second logical partition.

23. A system for providing increased database fault tolerance in a data storage environment, wherein a first Database Management Service (DBMS) instance and a second DBMS instance are communicably coupled with a data store, and wherein the first DBMS instance is communicably coupled to the second DBMS instance through a communication facility, the first DBMS instance being a primary handler of requests to interact with the data store and the second DBMS instance being a shadow instance that monitors the first DBMS instance, the system comprising:
  memory storing a data store; and
  one or more processors that:
    initiate, by the first DBMS instance, at least one first process associated with execution of a request to interact with the data store;
    notify, by the first DBMS instance using the communication facility, the second DBMS instance of the at least one first process; and
    initiate, by the second DBMS instance, at least one second process associated with the at least one first process,
  wherein the at least one first process comprises execution of a command from the first DBMS instance to open a dataset in the data store,
  wherein notification by the first DBMS instance to the second DBMS instance comprises communication of a message from the first DBMS instance to the second DBMS instance, the message notifying the second DBMS instance of the dataset to be opened, and wherein the at least one second process comprises execution of a second command from the second DBMS instance to open the dataset based, at least in part, on the message,
  wherein the dataset to be opened is opened in parallel by the first DBMS instance and the second DBMS instance, whereby the dataset to be opened is opened by the second DBMS instance before failure of the first DBMS instance.

24. The system of claim 23, wherein the one or more processors further:
  execute a data processing query from the first DBMS instance using the opened dataset; and
  communicate information from the first DBMS instance associated with the data processing query to the communication facility.

25. The system of claim 24, wherein the one or more processors further:
  generate a log by the first DBMS instance, the log comprising information related to data processing of the first DBMS instance; and
  monitor data processing of the first DBMS instance at the second DBMS instance using the communication facility by instructing the second DBMS instance to scan the log to identify processing by the first DBMS instance.

26. The system of claim 25, wherein the one or more processors further automatically performs data processing using the second DBMS instance in response to a failure of the first DBMS instance.

27. The system of claim 26, wherein the one or more processors that perform data processing using the second DBMS instance in response to a failure of the first DBMS instance further:
  reprocesses a pipeline executed by the first DBMS instance on the data store using the second DBMS based, at least in part, on the scanned log; and
  in response to identifying a rollback, schedules the rollback for the data store using the second DBMS.

28. The system of claim 24, wherein the one or more processors further:
  execute a command to close the dataset using the first DBMS instance;
  communicate a message from the first DBMS instance to the second DBMS instance, the message notifying the second DBMS instance of the dataset to be closed; and
  execute a second command from the second DBMS to close the dataset based, at least in part, on the message.

29. The system of claim 23, wherein the one or more processors further:
  receive, by the second DBMS instance, notification that the first DBMS instance failed to execute the request; and
  attempt, by the second DBMS instance, to execute the request using, at least in part, the at least one second process.

30. The system of claim 23, the second DBMS instance comprising a local DBMS instance.

31. The system of claim 30, wherein the one or more processors further monitor data processing of the first DBMS instance at a third DBMS instance using the communication facility communicably coupled to the data store, the third DBMS instance comprising a second shadow instance operable and comprising a remote DBMS instance.

32. The system of claim 23, the second DBMS instance comprising a remote DBMS instance.

* * * * *